Sept. 18, 1956  R. P. DAVIE, JR  2,763,448
AIRCRAFT WING LEADING EDGE CONSTRUCTION
Filed Jan. 15, 1952

Robert P. Davie, Jr.
INVENTOR.

BY *James M. Clark*
HIS PATENT ATTORNEY.

United States Patent Office 2,763,448
Patented Sept. 18, 1956

2,763,448

AIRCRAFT WING LEADING EDGE CONSTRUCTION

Robert P. Davie, Jr., Manhattan Beach, Calif., assignor to North American Aviation, Inc.

Application January 15, 1952, Serial No. 266,540

9 Claims. (Cl. 244—44)

The present invention relates to variable camber airfoils and aircraft wings and more particularly to an improved leading edge construction and mechanism for changing the contour of an aircraft wing.

It is frequently desirable in aircraft design to vary the profile or contour of an airfoil or wing to change its flight characteristics under certain operating conditions. Numerous arrangements have heretofore been proposed for varying the contour or camber of an airfoil, as well as its leading edge portion, and the present invention relates to an improved construction and mechanism for accomplishing these results in a more satisfactory manner than has heretofore been obtained by certain of the prior devices.

It is accordingly a major object of the present invention to provide improved variable camber constructions and mechanisms for varying the contour of the leading edge of an airfoil or wing by the use of a flexible wing cover sheet rigidly attached along one portion and slidably supported at the opposite portion. It is a further object to provide such mechanism which is simple in construction and operation, which does not impair the structural qualities of the wing, and which is positive and fool-proof in its operation. A further object resides in providing an improved joint in an airfoil construction between fixed and sliding portions of the skin covering. A still further object resides in the provision of a contour varying mechanism utilizing a pivotally mounted projectible roller engaging a flexible portion of the wing leading edge for extending the same into projected positions at which predetermined profiles or contours are obtained.

Other objectives and advantages of the present invention will occur to those skilled in the art after reading the following description, taken in conjunction with the accompanying drawings, forming a part hereof, in which.

Figure 1:
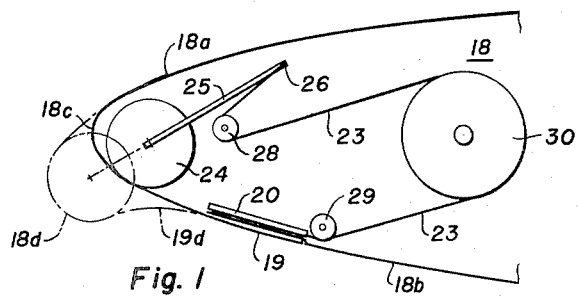
Fig. 1 is a diagrammatic view of the leading edge of an airfoil to which a form of the improved construction and mechanism has been applied.
Figure 2:
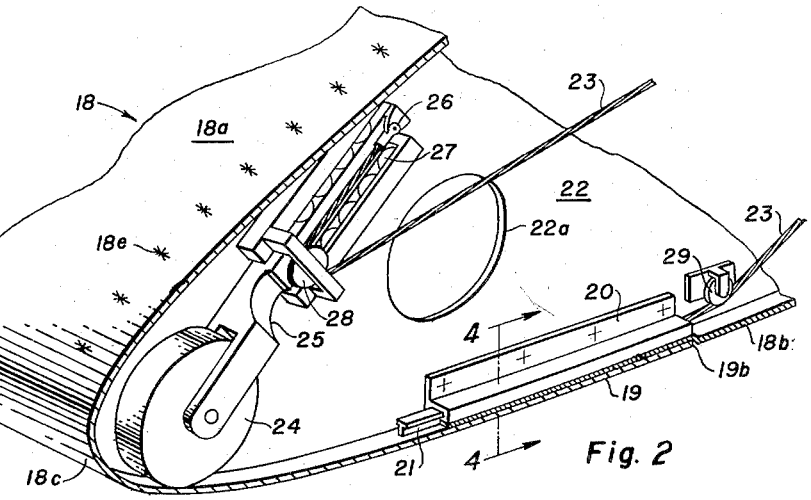
Fig. 2 is a perspective view of the same to an enlarged scale showing the details thereof.

Referring now to the diagrammatic showing of Fig. 1, the airfoil or wing is indicated by the numeral 18 having an upper surface 18a and an undersurface 18b, only the leading edge portion of the airfoil being shown in this figure. The normal leading edge of the airfoil is indicated at 18c and the extended or drooped leading edge at 18d. The flexible portion of the leading edge is indicated at 19, and in its drooped condition at 19d, being attached to the rail 21 and guided for chordwise movement within the guide element 20, fixed to the bulkhead 22, by pull upon the attached cable 23. In this modification, the cable 23 is connected to the aft end of the rail element 21 as best shown in Fig. 2 at one end and at its opposite end to a pivotally mounted roller 24 disposed at the region of the airfoil leading edge. The roller 24 is pivotally mounted upon the reciprocable yoke member 25 to the aft end of which the cable 23 is connected at 26 and is guided over the sheaves 28 and 29 as well as over the control drum 30. The upper aft portion of the yoke member 25 is guided for rectilinear movement between the guide rollers 27.

Figure 4:
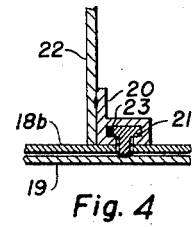
Fig. 4 is a sectional view of the sliding joint as taken at 4—4 of Fig. 2.

The construction is shown in greater detail in Figs. 2 and 4 in which the rail 21, attached to the flexible portion 19 and guided within the fixed guide element 20, is attached at its aft portion to the cable 23 running over the sheave 29. The upper or forward run, of the cable 23 when tensioned serves to draw the pivoted roller element 24 forwardly to flex the skin portion 19. The roller 24, as indicated above, is pivotally mounted upon the yoke portion of the member 25 which is guided within the roller guide structure 27 which is attached at its aft portion 26 to the upper run terminal of the cable 23, the latter engaging the sheave 28 around which it passes before extending rearwardly to the sheave 30. The numeral 22 represents the chordwise bulkhead provided with suitable lightening holes 22a, and both the guide element 20 and the roller guide structure 27 are preferably fixedly attached to the bulkhead 22. As in the case of the following modification, it will be understood that the airfoil is provided with a plurality of chordwise bulkheads as well as a plurality of flexing mechanisms, at spanwise spaced intervals for suitably changing the contour of the desired portion of the leading edge of the wing. It will also be understood that suitable stops may be provided such as on the cable 23 to limit the extent of movement of the flexible portion 19 of the leading edge sheet.

Figure 3:
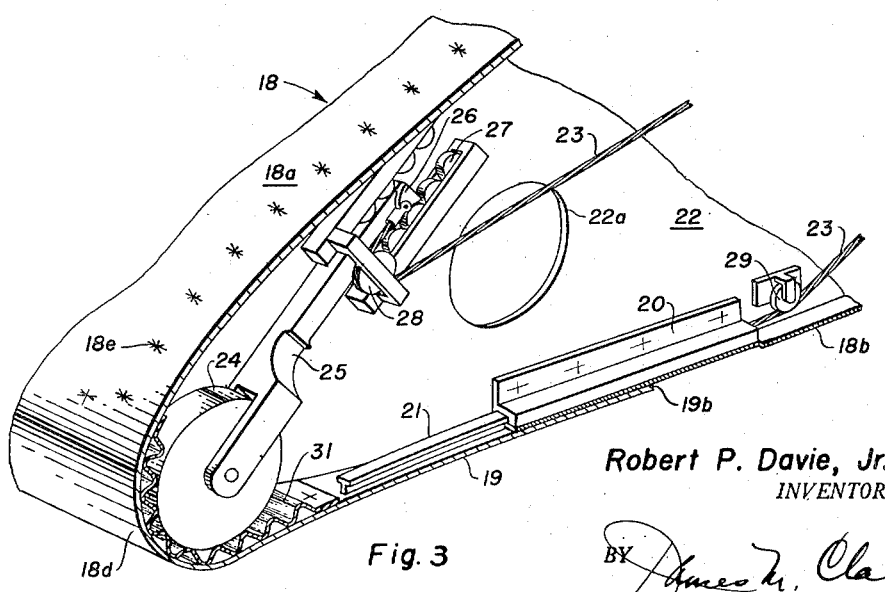
Fig. 3 is a similar view of a modified construction showing the leading edge in its extended drooped condition.

A modification is indicated in Fig. 3, which is substantially identical with the construction and mechanism shown in Fig. 2 with the exception that a corrugated reinforcing portion 31 is fixedly attached to the inner surface of the wing leading edge to stiffen the flexible leading edge sheet in the region of the contacting roller 24. The corrugations are preferably run in the spanwise direction to provide stiffness in that direction and a reasonable degree of flexibility in the chordwise direction. Whereas in Fig. 2, wherein the roller 24 is shown in retracted position and the airfoil assumes its retracted or basic shape, the roller 24 in Fig. 3 has been extended by tensioning of the upper run of the cable 23 and slackening or paying-out of the lower run of this cable permitting the flexible portion 19 to be drawn forwardly and downwardly into the dropped position shown in this figure as the roller is extended forwardly and downwardly. It will be understood that the wing skin sheets 18b and 19 are overlapped such that no opening is created by the separation of the movable flexible skin trailing edge 19b from the leading edge of the undersurface skin 18b, and is internally sealed in a substantially flush condition at all times to prevent airflow from entering the interior of the wing.

Other forms and modifications of the present invention, which will occur to those skilled in the art after reading the foregoing description, are intended to come within the scope and spirit of this invention as more particularly set forth in the appended claims.

I claim:

1. In an airfoil, an internal wing structure, a skin covering portion fixedly attached to said wing structure, a flexible skin covering portion in sliding engagement with said fixed portion of said skin covering, means including a projectible roller reciprocably mounted upon said wing structure, said roller rollingly engageable with the inner surface of said flexible skin covering portion, and actuating means for projecting said roller for extending said flexible skin covering portion to vary the camber of said airfoil.

2. In a variable camber airfoil, an internal wing structure, a flexible skin covering having a portion fixedly attached to said wing structure, a further portion of said skin covering in sliding engagement with said fixed portion of said skin covering and means including a projectible roller pivotally and slidably mounted upon said wing structure and in rolling contact with the inner surface of said flexible skin portion for extending said flexible portion to vary the camber of said airfoil.

3. In an airfoil, an internal structure, upper and lower surface sheets fixed to said internal structure, a flexible leading edge sheet attached at its upper portion to said internal structure and slidingly engaging said fixed lower surface sheet at the lower portion of said leading edge sheet, rectilinear guide means fixed to said internal structure, a strut element reciprocably mounted within said guide means, a roller pivotally mounted upon said strut element, said roller in contact with said leading edge sheet intermediate said upper and lower portions, and control means connected to said strut element for reciprocating said roller and moving said leading edge sheet for extending and flexing said intermediate sheet portion for changing the contour of the leading edge of said airfoil.

4. In an aircraft wing, an internal wing structure, a leading edge skin sheet fixedly attached to said wing structure having portions forming the upper and lower surfaces of the wing leading edge, the upper portion of said leading edge sheet attached to said wing structure and the lower portion of said leading edge sheet slidingly attached to said wing structure, said slidingly attached leading edge lower portion slidingly overlapping the fixed undersurface of said wing, rectilinear guide means fixed to said internal wing structure, a strut element reciprocably mounted within said guide means, a roller pivotally mounted upon said strut element, said roller in rolling contact with said leading edge sheet intermediate said upper and lower portions and cable actuating means attached to said strut element and to said leading edge undersurface portion for changing the cross-sectional profile of the leading edge of said wing.

5. In a variable profile wing leading edge, an internal wing structure, said wing having upper and undersurface coverings, a leading edge sheet having portions forming the upper and lower surfaces of said leading edge, the upper portion of said leading edge sheet attached to said wing structure, the lower portion of said leading edge sheet slidingly attached to said wing structure, said leading edge lower portion overlapping the fixed undersurface sheet covering of said wing, rectilinear guide means fixed to said internal wing structure, a strut element reciprocably mounted within said guide means, a roller pivotally mounted upon said strut element, said roller in rolling contact with said leading edge sheet intermediate said upper and lower portions, further guide means for said leading edge lower portion including a shaped rail and a complementally slotted element slidably receiving said rail, the latter and said element being mounted on said leading edge sheet lower portion and on said fixed undersurface sheet covering respectively between said overlapping sheet portions, and actuating means attached to said strut element and to said leading edge lower sheet portion for simultaneously moving said roller and deforming said lower portion of said leading edge sheet in the region of said roller with respect to said wing structure for changing the cross-sectional profile of the leading edge of said wing.

6. An airfoil camber varying arrangement of the type called for by claim 1, characterized by the attachment of skin reinforcing means to the inner face of said flexible skin covering portion in the region of said projectible reciprocably mounted roller.

7. A variable camber airfoil of the type called for by claim 2 characterized by the inclusion of corrugated reinforcing members attached to the inner surface of said flexible skin covering for engagement by said projectible roller.

8. A variable camber airfoil of the type called for by claim 2 characterized by the inclusion of a corrugated reinforcing element attached to the inner surface of said flexible portion of said skin covering in the region of said projectible roller, the said corrugated reinforcing element extending in the spanwise direction of the airfoil to provide stiffness in that direction and a degree of flexibility in the chordwise direction.

9. A variable camber airfoil of the type set forth in claim 1 characterized by the inclusion of a corrugated reinforcing member attached to the inner surface of said flexible skin covering for rolling contact engagement by said projectible roller, the corrugations of said reinforcing member extending in the spanwise direction to provide stiffness in that direction and a degree of flexibility in the chordwise direction.

References Cited in the file of this patent

UNITED STATES PATENTS

| | | |
|---|---|---|
| 1,317,413 | Antoni et al. | Sept. 30, 1919 |
| 1,540,105 | Cook | June 2, 1925 |
| 1,567,531 | Magni | Dec. 29, 1925 |
| 1,631,259 | Gilmore | June 7, 1927 |
| 1,766,107 | Cook | June 24, 1930 |
| 1,848,368 | McMaster | Mar. 8, 1932 |
| 2,258,490 | Cutridge | Oct. 7, 1941 |
| 2,323,542 | Jacobs | July 6, 1943 |
| 2,378,528 | Arsandaux | June 19, 1945 |
| 2,384,933 | Lee | Sept. 18, 1945 |